US012566610B2

(12) United States Patent
Tran

(10) Patent No.: US 12,566,610 B2
(45) Date of Patent: Mar. 3, 2026

(54) MICROPROCESSOR WITH APPARATUS AND METHOD FOR REPLAYING LOAD INSTRUCTIONS

(71) Applicant: Simplex Micro, Inc., Austin, TX (US)

(72) Inventor: Thang Minh Tran, Austin, TX (US)

(73) Assignee: Simplex Micro, Inc., Austin, TX (US)

( * ) Notice: Subject to any disclaimer, the term of this patent is extended or adjusted under 35 U.S.C. 154(b) by 155 days.

(21) Appl. No.: 18/237,511

(22) Filed: Aug. 24, 2023

(65) Prior Publication Data

US 2024/0311156 A1 Sep. 19, 2024

Related U.S. Application Data

(60) Provisional application No. 63/451,971, filed on Mar. 14, 2023.

(51) Int. Cl.
*G06F 9/38* (2018.01)
*G06F 9/30* (2018.01)

(52) U.S. Cl.
CPC ........ *G06F 9/3836* (2013.01); *G06F 9/30043* (2013.01); *G06F 9/3016* (2013.01)

(58) Field of Classification Search
CPC .................................................... G06F 9/3836
See application file for complete search history.

(56) References Cited

U.S. PATENT DOCUMENTS

| | | |
|---|---|---|
| 5,021,985 A | 6/1991 | Hu et al. |
| 5,185,868 A | 2/1993 | Tran |
| 5,187,796 A | 2/1993 | Wang et al. |
| 5,251,306 A | 10/1993 | Tran |
| 5,497,467 A | 3/1996 | Wakui et al. |
| 5,655,096 A | 8/1997 | Branigin |
| 5,689,653 A | 11/1997 | Karp et al. |
| 5,699,536 A | 12/1997 | Hopkins et al. |

(Continued)

FOREIGN PATENT DOCUMENTS

| | | |
|---|---|---|
| EP | 0840213 A2 | 5/1998 |
| EP | 0902360 A2 | 3/1999 |

(Continued)

OTHER PUBLICATIONS

Anonymous: "RISC-V—Wikipedia", Apr. 16, 2022 (Apr. 16, 2022), XP093142703, Retrieved from the Internet: URL:https://en.wikipedia. org/w/index.php?title=RISC-V&oldid=1083030760 [retrieved on Mar. 27, 2024].

(Continued)

*Primary Examiner* — Michael J Metzger
(74) *Attorney, Agent, or Firm* — Appleton Luff

(57) ABSTRACT

A processor includes a time counter and a time-resource matrix and provides a method for statically dispatching load/store instructions if the required resources are available based on data stored in the time-resource matrix, and wherein execution times for the load/store instructions use a time count from the time counter to specify when the load/store instructions may be provided to a load-store unit pipeline. The execution times of the load instruction is based on the data cache hit latency time. A delay of the load/store instruction causes the load/store instruction to be replayed with known or estimated time. A load-store unit employs multiple bank queues to access multiple data banks of a data cache.

20 Claims, 6 Drawing Sheets

(56) References Cited

U.S. PATENT DOCUMENTS

| | | | |
|---|---|---|---|
| 5,799,163 | A | 8/1998 | Park et al. |
| 5,802,386 | A | 9/1998 | Kahle et al. |
| 5,809,268 | A | 9/1998 | Chan |
| 5,835,745 | A | 11/1998 | Sager et al. |
| 5,860,018 | A | 1/1999 | Panwar |
| 5,870,579 | A | 2/1999 | Tan |
| 5,881,302 | A | 3/1999 | Omata |
| 5,903,779 | A | 5/1999 | Park |
| 5,903,919 | A | 5/1999 | Myers |
| 5,933,618 | A | 8/1999 | Tran et al. |
| 5,958,041 | A | 9/1999 | Petolino, Jr. et al. |
| 5,961,630 | A | 10/1999 | Zaidi et al. |
| 5,964,867 | A | 10/1999 | Anderson et al. |
| 5,974,538 | A | 10/1999 | Wilmot, II |
| 5,996,061 | A | 11/1999 | Lopez-Aguado et al. |
| 5,996,064 | A | 11/1999 | Zaidi et al. |
| 6,003,128 | A | 12/1999 | Tran |
| 6,016,540 | A | 1/2000 | Zaidi et al. |
| 6,035,389 | A | 3/2000 | Grochowski et al. |
| 6,035,393 | A | 3/2000 | Glew et al. |
| 6,065,105 | A | 5/2000 | Zaidi et al. |
| 6,247,113 | B1 | 6/2001 | Jaggar |
| 6,282,634 | B1 | 8/2001 | Hinds et al. |
| 6,304,955 | B1 | 10/2001 | Arora |
| 6,425,090 | B1 | 7/2002 | Arimilli et al. |
| 6,453,424 | B1 | 9/2002 | Janniello |
| 6,591,359 | B1 | 7/2003 | Hass et al. |
| 6,671,799 | B1 | 12/2003 | Parthasarathy |
| 6,959,379 | B1 | 10/2005 | Wojcieszak et al. |
| 7,069,425 | B1 | 6/2006 | Takahashi |
| 7,434,032 | B1 | 10/2008 | Coon et al. |
| 8,166,281 | B2 | 4/2012 | Gschwind et al. |
| 9,256,428 | B2 | 2/2016 | Heil et al. |
| 9,348,590 | B1 | 5/2016 | Kashyap et al. |
| 9,354,884 | B2 | 5/2016 | Comparan et al. |
| 10,339,095 | B2 | 7/2019 | Moudgill et al. |
| 10,346,171 | B2 | 7/2019 | Gabor et al. |
| 10,437,595 | B1* | 10/2019 | Kanapathipillai .... G06F 9/3838 |
| 11,062,200 | B2 | 7/2021 | Lie et al. |
| 11,132,199 | B1 | 9/2021 | Tran |
| 11,144,319 | B1 | 10/2021 | Battle et al. |
| 11,163,582 | B1 | 11/2021 | Tran |
| 11,188,478 | B1 | 11/2021 | Tran |
| 11,204,770 | B2 | 12/2021 | Tran |
| 11,263,013 | B2 | 3/2022 | Tran |
| 11,467,841 | B1 | 10/2022 | Tran |
| 11,829,187 | B2 | 11/2023 | Tran |
| 11,954,491 | B2 | 4/2024 | Tran |
| 12,061,906 | B2 | 8/2024 | Stephens et al. |
| 2001/0004755 | A1 | 6/2001 | Levy et al. |
| 2003/0023646 | A1 | 1/2003 | Lin et al. |
| 2003/0135712 | A1 | 7/2003 | Theis |
| 2004/0073779 | A1 | 4/2004 | Hokenek et al. |
| 2004/0168045 | A1 | 8/2004 | Morris et al. |
| 2004/0236920 | A1 | 11/2004 | Sheaffer |
| 2004/0243894 | A1* | 12/2004 | Smith ................. G06F 11/3648 |
| | | | 714/724 |
| 2005/0038980 | A1 | 2/2005 | Rodgers et al. |
| 2005/0251657 | A1 | 11/2005 | Boucher |
| 2006/0010305 | A1 | 1/2006 | Maeda et al. |
| 2006/0095732 | A1 | 5/2006 | Tran et al. |
| 2006/0218124 | A1 | 9/2006 | Williamson et al. |
| 2006/0259800 | A1 | 11/2006 | Maejima |
| 2006/0288194 | A1 | 12/2006 | Lewis et al. |
| 2007/0028078 | A1* | 2/2007 | Harris ................... G06F 9/3838 |
| | | | 712/214 |
| 2007/0038984 | A1 | 2/2007 | Gschwind et al. |
| 2007/0113058 | A1 | 5/2007 | Tran et al. |
| 2007/0113059 | A1 | 5/2007 | Tran |
| 2007/0255903 | A1 | 11/2007 | Tsadik et al. |
| 2007/0260856 | A1 | 11/2007 | Tran et al. |
| 2008/0114966 | A1 | 5/2008 | Begon et al. |
| 2008/0294882 | A1 | 11/2008 | Jayapala et al. |
| 2009/0113192 | A1 | 4/2009 | Hall et al. |
| 2009/0158279 | A1 | 6/2009 | Iino et al. |

| | | | |
|---|---|---|---|
| 2009/0217020 | A1 | 8/2009 | Yourst |
| 2010/0049958 | A1 | 2/2010 | Vaskevich et al. |
| 2010/0064106 | A1 | 3/2010 | Yamada et al. |
| 2011/0099354 | A1 | 4/2011 | Takashima et al. |
| 2011/0153987 | A1 | 6/2011 | Luke et al. |
| 2011/0320765 | A1 | 12/2011 | Karkhanis et al. |
| 2012/0047352 | A1 | 2/2012 | Yamana |
| 2012/0060015 | A1 | 3/2012 | Eichenberger et al. |
| 2012/0124344 | A1 | 5/2012 | Jarvis |
| 2012/0151156 | A1 | 6/2012 | Citron et al. |
| 2013/0151816 | A1 | 6/2013 | Indukuru et al. |
| 2013/0297912 | A1 | 11/2013 | Tran et al. |
| 2013/0298129 | A1 | 11/2013 | Rabinovitch et al. |
| 2013/0346985 | A1 | 12/2013 | Nightingale |
| 2014/0059328 | A1 | 2/2014 | Gonion |
| 2014/0082626 | A1 | 3/2014 | Busaba et al. |
| 2015/0026435 | A1 | 1/2015 | Muff et al. |
| 2015/0089141 | A1 | 3/2015 | Chen et al. |
| 2015/0100754 | A1 | 4/2015 | Reid et al. |
| 2015/0212972 | A1 | 7/2015 | Boettcher et al. |
| 2015/0227369 | A1 | 8/2015 | Gonion |
| 2015/0331760 | A1* | 11/2015 | Dalessandro ......... G06F 3/0619 |
| | | | 714/19 |
| 2016/0092230 | A1 | 3/2016 | Chen et al. |
| 2016/0092238 | A1 | 3/2016 | Codrescu et al. |
| 2016/0275043 | A1 | 9/2016 | Grochowski et al. |
| 2016/0283240 | A1 | 9/2016 | Mishra et al. |
| 2016/0371091 | A1 | 12/2016 | Brownscheidle et al. |
| 2017/0177345 | A1 | 6/2017 | Ould-Ahmed-Vall et al. |
| 2017/0177354 | A1 | 6/2017 | Ould-Ahmed-Vall |
| 2017/0185407 | A1 | 6/2017 | Shwartsman |
| 2017/0357513 | A1 | 12/2017 | Ayub et al. |
| 2017/0371657 | A1 | 12/2017 | Mahurin et al. |
| 2018/0181400 | A1 | 6/2018 | Scherbinin et al. |
| 2018/0196678 | A1 | 7/2018 | Thompto |
| 2018/0253310 | A1 | 9/2018 | Stephens |
| 2018/0321938 | A1 | 11/2018 | Boswell et al. |
| 2019/0079764 | A1 | 3/2019 | Diamond et al. |
| 2019/0243646 | A1 | 8/2019 | Anderson |
| 2019/0303161 | A1 | 10/2019 | Nassi et al. |
| 2020/0004534 | A1 | 1/2020 | Gurram et al. |
| 2020/0004543 | A1 | 1/2020 | Kumar et al. |
| 2020/0065111 | A1 | 2/2020 | Bouzguarrou et al. |
| 2020/0089528 | A1 | 3/2020 | Gutierrez et al. |
| 2020/0125498 | A1 | 4/2020 | Betts et al. |
| 2020/0310796 | A1 | 10/2020 | Pfister et al. |
| 2020/0319885 | A1 | 10/2020 | Eyole et al. |
| 2020/0387382 | A1 | 12/2020 | Tseng et al. |
| 2021/0026639 | A1 | 1/2021 | Tekmen et al. |
| 2021/0200550 | A1 | 7/2021 | Sivtsov et al. |
| 2021/0208891 | A1 | 7/2021 | Wen et al. |
| 2021/0311743 | A1 | 10/2021 | Tran |
| 2021/0326141 | A1 | 10/2021 | Tran |
| 2021/0389979 | A1 | 12/2021 | Tran |
| 2022/0066760 | A1 | 3/2022 | Chang et al. |
| 2022/0326988 | A1 | 10/2022 | Gunter et al. |
| 2023/0068637 | A1 | 3/2023 | Feiste et al. |
| 2023/0130826 | A1 | 4/2023 | Segger |
| 2023/0214218 | A1 | 7/2023 | Battle et al. |
| 2023/0244490 | A1 | 8/2023 | Tran |
| 2023/0244491 | A1 | 8/2023 | Tran |
| 2023/0367599 | A1 | 11/2023 | Waterman et al. |
| 2023/0393852 | A1 | 12/2023 | Tran |

FOREIGN PATENT DOCUMENTS

| | | |
|---|---|---|
| EP | 0959575 A1 | 11/1999 |
| WO | 0010076 A1 | 2/2000 |
| WO | 0208894 A1 | 1/2002 |
| WO | 0213005 A1 | 2/2002 |
| WO | 2024015445 A1 | 1/2024 |

OTHER PUBLICATIONS

PCT/US2023/018970, International Preliminary Report on Patentability, Jul. 18, 2024.
PCT/US2023/018996, International Preliminary Report on Patentability, Jul. 19, 2024.

(56)     References Cited

OTHER PUBLICATIONS

PCT/US2023/018996, Written Opinion of the International Preliminary Examining Authority, Apr. 8, 2024.
PCTUS2023081682, Written Opinion of the International Searching Authority, Mar. 22, 2024.
Written Opinion of The International Preliminary Examining Authority, PCTUS2023/018970, Mar. 25, 2024.
U.S. Appl. No. 17/588,315, filed Jan. 30, 2022, Thang Minh Tran.
U.S. Appl. No. 17/672,622, filed Feb. 15, 2022, Thang Minh Tran.
U.S. Appl. No. 17/697,865, filed Mar. 17, 2022, Thang Minh Tran.
U.S. Appl. No. 17/697,870, filed Mar. 17, 2022, Thang Minh Tran.
U.S. Appl. No. 17/713,569, filed Apr. 5, 2022, Thang Minh Tran.
U.S. Appl. No. 17/725,476, filed Apr. 20, 2022, Thang Minh Tran.
U.S. Appl. No. 17/829,909, filed Jun. 1, 2022, Thang Minh Tran.
Choi, W., Park, SJ., Dubois, M. (2009). Accurate Instruction Pre-scheduling in Dynamically Scheduled Processors. In: Stenström, P. (eds) Transactions on High-Performance Embedded Architectures and Compilers I. Lecture Notes in Computer Science, vol. 5470 Springer, Berlin, Heidelberg. pp. 107-127. (Year: 2009).
Diavastos, Andreas & Carlson, Trevor. (2021). Efficient Instruction Scheduling using Real-time Load Delay Tracking. (Year: 2021).

J. S. Hu, N. Vijaykrishnan and M. J. Irwin, "Exploring Wakeup-Free Instruction Scheduling," 10th International Symposium on High Performance Computer Architecture (HPCA'04), Madrid, Spain, pp. 232-232 (Year: 2004).
PCT/US23/27497: Written Opinion of the International Searching Authority.
Written Opinion of the International Searching Authority, PCT/S2022/052185.
Written Opinion of the International Searching Authority, PCT/US2023/018970.
Written Opinion of the International Searching Authority, PCT/US2023/018996.
H. O. Kultala et al., "Exposed datapath optimizations for loop scheduling," 2017 International Conference on Embedded Computer Systems: Architectures, Modeling, and Simulation (SAMOS), Pythagorion, Greece, pp. 171-178 (Year: 2017).
PCT/US2024/02037, Written Opinion of the International Searching Authority, Dec. 11, 2024.
PCT/US2024/020737 International Search Report, Dec. 11, 2024.
Wang, Y., Jia, Z., Chen, R., Wang, M., Liu, D. and Shao, Z., Loop scheduling with memory access reduction subject to register constraints for DSP applications. Softw. Pract. Exper., pp. 999-1026. (Year: 2014).

* cited by examiner

Execution Queue

| v | ex_ctrl | imm data | rs1 sel | rs2 sel | wr reg | src regs | replay | rs1/rs2 v | ld data | wr val | Unk | Rd time |
|---|---------|----------|---------|---------|--------|----------|--------|-----------|---------|--------|-----|---------|
| 1 | ctrl data | data | 3 | 4 | x5 | x4/x3 | 0 | 0/0 | data | 0 | 0 | 20 |
| 1 | ctrl data | data | 4 | 0 | x11 | x20/x10 | 1 | 0/0 | data | 1 | 1 | 27 |
| 1 | ctrl data | data | 1 | 0 | x24 | x15/x20 | 1 | 1/1 | data | 0 | 0 | 25 |
| 1 | ctrl data | data | 2 | 3 | x27 | x7/x31 | 1 | 0/1 | data | 0 | 0 | 32 |
| 71 | 72 | 73 | 74 | 76 | 79 | 179 | 172 | 174 | 176 | 173 | 178 | 77 |

70 time count

=? =? =? =?   78   Hit select inst to issue

FIG. 5

MICROPROCESSOR WITH APPARATUS AND METHOD FOR REPLAYING LOAD INSTRUCTIONS

BACKGROUND

Related Applications

This application claims priority to U.S. Patent Application Ser. No. 63/451,971, filed Mar. 14, 2023, and entitled "Microprocessor with Apparatus and Method for Replaying Load and Store Instructions," which application is hereby incorporated by reference in its entirety, and which application is assigned to the assignee of the present application. This application is related to U.S. patent application Ser. No. 17/588,315, filed Jan. 30, 2022, and entitled "Microprocessor with Time Counter for Statically Dispatching Instructions," which application is hereby incorporated by reference in its entirety, and which application is assigned to the assignee of the present application, and related to U.S. patent application Ser. No. 17/713,569, filed Apr. 5, 2022, and entitled "Microprocessor with Apparatus and Method for Replaying Instructions," which application is hereby incorporated by reference in its entirety, and which application is assigned to the assignee of the present application.

Technical Field

The present invention relates to the field of computer processors. More particularly, it relates to issuing and executing instructions based on a time count in a processor where the processor consists of a general-purpose microprocessor, a digital-signal processor, a single instruction multiple data processor, a vector processor, a graphics processor, or other type of microprocessor which executes instructions.

Technical Background

Processors have become increasingly complex chasing small increments in performance at the expense of power consumption and semiconductor chip area. The approach in out-of-order (OOO) superscalar microprocessors has remained basically the same for the last 25-30 years, with much of the power dissipation arising from the dynamic scheduling of instructions for execution from reservation stations or central windows. Designing an OOO superscalar microprocessor is a huge undertaking. Hundreds of instructions are issued to the execution pipeline where data dependencies are resolved and arbitrated for execution by a large number of functional units. The result data from the functional units are again arbitrated for the write buses to write back to the register file. If the data cannot be written back to the register file, then the result data are kept in temporary registers and a complicated stalling procedure is performed for the execution pipeline.

An alternative to OOO superscalar processors is very-long-instruction-word (VLIW) processors. These have diminished interest in the industry because of the need for a complex compiler and relatively weak performance.

The latency of a processor's load instruction is often the determining factor in performance due to the high frequency of load instructions and that it has the longest latency in the instruction set. Typically, the load instruction has priority in the execution pipeline of the microprocessor. Load dependent instructions also typically have priority for execution as soon as the load data are available. The load latency time is a function of data cache hit rate. The load can be delayed by many causes including data bank conflict, data cache miss, 1-bit error correction (ECC), translation look-aside buffer (TLB) miss, and unaligned access to multiple cache lines. All delayed load instructions are replayed since the processor executes instructions based on a preset time.

Thus, there is a need for a speculative execution microprocessor, including an OOO superscalar microprocessor, which consumes less power, has a simpler design, and employs a simple mechanism for replaying of different delay scenarios for load instructions.

SUMMARY

The disclosed embodiments provide a processor with a time counter and a method for statically dispatching instructions to an execution pipeline with preset execution times based on a time count from the counter. A source operand that is determined to be no longer valid may be retained in the execution queue for replay.

A disclosed approach to microprocessor design employs static scheduling of instructions. A disclosed static scheduling algorithm is based on the assumption that a new instruction has a perfect view of all previous instructions in the execution pipeline, and thus it can be scheduled for execution at an exact time in the future, e.g., with reference to a time count from a counter. Assuming an instruction has 2 source operands and 1 destination operand, the instruction can be executed out-of-order when conditions are met of (1) no data dependency, (2) availability of read buses to read data from the register file, (3) availability of a functional unit to execute the instruction, and (4) availability of a write bus to write result data back to the register file.

All the above requirements are associated with time: (1) a time when all data dependencies are resolved, (2) at which time the read buses are available to read source operands from a register file, (3) at which subsequent time the functional unit is available to execute the instruction, and (4) at which further subsequent time the write bus is available to write result data back to the register file.

In one embodiment a time counter increments periodically, for example, every clock cycle, and the resulting count is used to statically schedule instruction execution. Instructions have known throughput and latency times, and thus can be scheduled for execution based on the time count. For example, an add instruction with throughput and latency time of 1 can be scheduled to execute when any data dependency is resolved. If the time count is 5 and the add has no data dependency at time 8, then the available read buses are scheduled to read data from the register file at time 8, the available arithmetic logic unit (ALU) is scheduled to execute the add instruction at time 9, and the available write bus is scheduled to write result data from ALU to the register file at time 9. The read buses, the ALUs, and the write buses are the resources represented in a time-resource matrix in which the number of available resources is decremented at the usage times. The latency time of the load instructions is based on the data cache hit latency. The data cache hit rate is typically about 80-90% meaning that the write back times of some load instructions are different than the preset latency time. In another embodiment, the latency time for accessing level-2 (L2) cache memory is used to update the write back time of the load instruction in case of a data cache miss. In addition, multiple load instructions can have data bank conflict by accessing the same data bank of the data cache. The data cache is often implemented with static-random access memory (SRAM) array which allows single access per clock cycle. The data bank conflict adds extra clock cycles to the load latency time. If the load data are delayed, then the exact delay time is known by the L2 cache latency or by using the data bank delay time. Other types of delays include: (1) a translation look-aside buffer (TLB) miss where the L2 TLB accessing time is used for replay, (2) error correction code (ECC) 1-bit error correction where an extra cycle is added to the current write back time, and (3) unaligned access to a second cache line, where the second cache line is replayed as soon as possible.

In one embodiment, a register scoreboard is used to keep track of the write back time of destination registers for all instructions including the load instruction. If the write back time is delayed, then the register scoreboard is updated with a new write back time. When the instruction is dispatched from the execution queue to the functional unit, the register scoreboard is read again. If the write-back time is delayed, dispatch logic determines that a source operand will not be valid. The dispatch logic causes the instruction to remain in the execution queue and to be replayed at a later time based on the new write-back time.

In the following description, a short-hand reference is often made to a "load/store instruction" and such term refers to a load instruction or a store instruction. Where reference is made to an operation involving "load/store" the referenced operation is a load operation or a store operation. In one embodiment a processor includes a time counter which stores a time count incremented every clock cycle representing a current time of the processor, a time-resource matrix to indicate what resources are available at every time count, an instruction issue unit for receiving a first load/store instruction and issuing the first load/store instruction with a preset execution time based on the time count and the availability of the needed resources, and an execution queue for receiving the first load/store instruction from the instruction unit and dispatching the first load/store instruction to a functional unit when the preset execution time is the same as the time count. The load/store instruction takes many cycles in the load/store unit. The load/store entry in the execution queue remains valid until completion of the load/store instruction and replays the load/store instruction, if necessary, with different replay mechanisms.

BRIEF DESCRIPTION OF THE DRAWINGS

Aspects of the present invention are best understood from the following description when read with the accompanying figures.

FIG. 5 is a block diagram illustrating an execution queue; and

DETAILED DESCRIPTION

Figure 1:
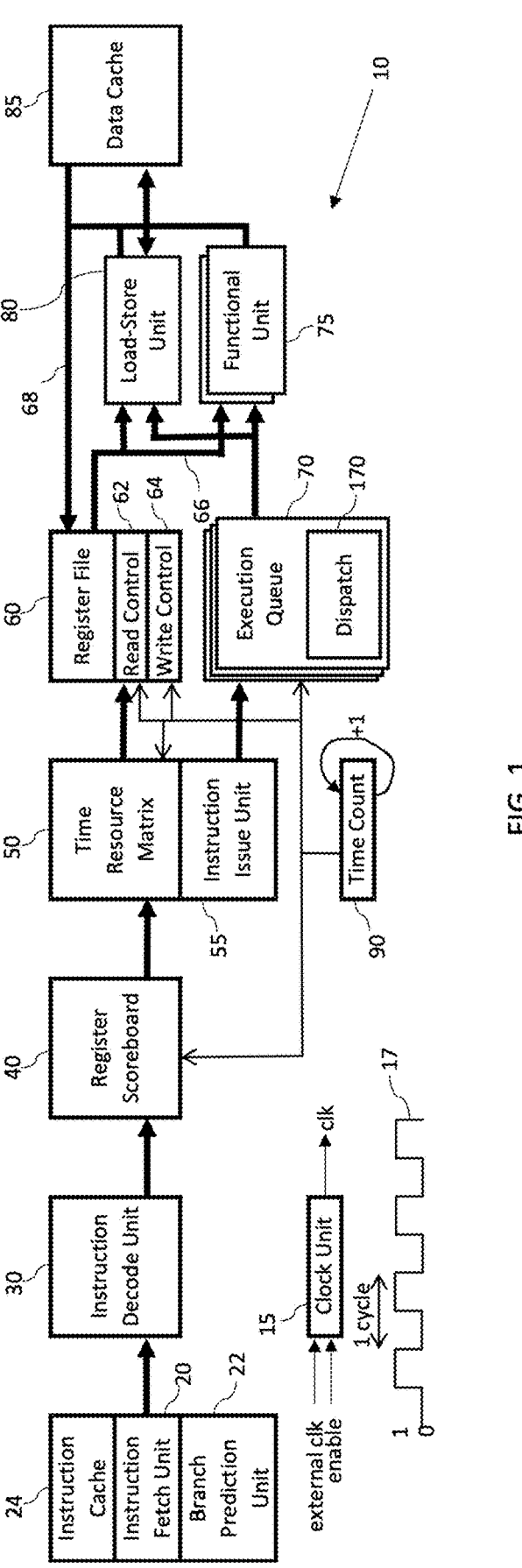
FIG. 1 is a block diagram illustrating a processor based data processing system in accordance with present invention.

The following description provides different embodiments for implementing aspects of the present invention.

Specific examples of components and arrangements are described below to simplify the explanation. These are merely examples and are not intended to be limiting. For example, the description of a first component coupled to a second component includes embodiments in which the two components are directly connected, as well as embodiments in which an additional component is disposed between the first and second components. In addition, the present disclosure repeats reference numerals in various examples. This repetition is for the purpose of clarity and does not in itself require an identical relationship between the embodiments.

In one embodiment a processor is provided, typically implemented as a microprocessor, that schedules instructions to be executed at a preset time based on a time count from a time counter. In such a microprocessor the instructions are scheduled to be executed using the known throughput and latency of each instruction to be executed. For example, in one embodiment, the ALU instructions have throughput and latency times of 1, the multiply instructions have throughput time of 1 and the latency time of 2, the load instructions have the throughput time of 1 and latency time of 3 (based on a data cache hit), and the divide instruction have throughput and latency times of 32.

FIG. 1 is a block diagram of a microprocessor based data processing system. The exemplary system includes a microprocessor 10 having a clock unit 15, an instruction fetch unit 20, an instruction cache 24, a branch prediction unit 22, an instruction decode unit 30, a register scoreboard 40, a time-resource matrix 50, an instruction issue unit 55, a register file 60, a read control unit 62, a write control unit 64, a plurality of execution queues 70, a plurality of functional units 75, a load-store unit 80, and a data cache 85. Dispatch logic 170 associated with execution queue 70 is described in further detail in connection with FIG. 5 and supports replay of instructions when a source operand is delayed. The microprocessor 10 includes a plurality of read buses 66 from the register files to the functional units 75 and load-store unit 80. The system also includes a plurality of write buses 68 to write result data from the functional unit 75, the load-store unit 80, and the data cache 85 to the register file 60. The microprocessor 10 is a synchronous microprocessor where the clock unit 15 generates a clock signal ("clk") which couples to all the units in the microprocessor 10. The clock unit 15 provides a continuously toggling logic signal 17 which toggles between 0 and 1 repeatedly at a clock frequency. Clock output signal ("clk") of clock unit 15 enables synchronizing many different units and states in the microprocessor 10. The clock signal is used to sequence data and instructions through the units that perform the various computations in the microprocessor 10. The clock unit 15 may include an external clock as an input to synchronize the microprocessor 10 with external units (not shown). The clock unit 15 may further include an enable signal to disable the clock unit when the microprocessor is in idle stage or not use for instruction execution.

According to an embodiment the microprocessor 10 also includes a time counter unit 90 which stores a time count incremented, in one embodiment, every clock cycle. The time counter unit 90 is coupled to the clock unit 15 and uses "clk" signal to increment the time count.

In one embodiment the time count represents the time in clock cycles when an instruction in the instruction issue unit 55 is scheduled for execution. For example, if the current time count is 5 and an instruction is scheduled to be executed in 22 cycles, then the instruction is sent to the execution queue 70 with the execution time count of 27. When the time count increments to 26, the execution queue 70 issues the instruction to the functional unit 75 for execution in next cycle (time count 27). The time counter unit 90 is coupled to the register scoreboard 40, the time-resource matrix 50, the read control 62, the write control 64, and the plurality of execution queues 70. The scoreboard 40 resolves data dependencies in the instructions. The time-resource matrix 50 checks availability of the various resources which in one embodiment include the read buses 66, the functional units 75, the load-store unit 80, and the write buses 68. The read control unit 62, the write control unit 64, and the execution queues 70 receive the corresponding scheduled times from the instruction issue unit 55. The read control unit 62 is set to read the source operands from the register file 60 on specific read buses 66 at a preset time. The write control unit 64 writes the result data from a functional unit 75 or the load-store unit 80 or the data cache 85 to the register file 60 on a specific write bus 68 at a preset time discussed below. The execution queue 70 is set to dispatch an instruction to a functional unit 75 or the load-store unit 80 at a preset time. In each case, the preset time is the time setup by the instruction decode unit 30. The preset time is a future time based on the time count, so when the time count counts up to the future preset time, then the specified action will happen, where the specified action is reading data from the register file 60, writing data to the register file 60, or issuing an instruction to a functional unit 75 for execution. The instruction issue unit 55 determines that the instruction is free of any data dependency and the resources are available to set the "preset times" for the instruction to be executed in the execution pipeline.

In the microprocessor system 10 the instruction fetch unit 20 fetches the next instruction(s) from the instruction cache 24 to send to the instruction decode unit 30. One or more instructions can be fetched per clock cycle from the instruction fetch unit 20 depending on the configuration of microprocessor 10. For higher performance, an embodiment of microprocessor 10 fetches more instructions per clock cycle for the instruction decode unit 30. For low-power and embedded applications, an embodiment of microprocessor 10 might fetch only a single instruction per clock cycle for the instruction decode unit 30. If the instructions are not in the instruction cache 24 (commonly referred to as an instruction cache miss), then the instruction fetch unit 20 sends a request to external memory (not shown) to fetch the required instructions. The external memory may consist of hierarchical memory subsystems, for example, an L2 cache, an L3 cache, read-only memory (ROM), dynamic random-access memory (DRAM), flash memory, or a disk drive. The external memory is accessible by both the instruction cache 24 and the data cache 85. The instruction fetch unit 20 is also coupled with the branch prediction unit 22 for prediction of the next instruction address when the branch is detected and predicted by the branch prediction unit 22. The instruction fetch unit 20, the instruction cache 24, and the branch prediction unit 22 are described here for completeness of a microprocessor 10. In other embodiments, other instruction fetch and branch prediction methods can be used to supply instructions to the instruction decode unit 30 for microprocessor 10.

The instruction decode unit 30 is coupled to the instruction fetch unit 20 for new instructions, and also coupled to the register scoreboard 40. The instruction decode unit 30 decodes the instructions to determine instruction type, instruction throughput and latency times, and the register operands.

The register operands, as an example, may consist of 2 source operands and 1 destination operand. The operands are referenced to registers in the register file 60. The source and destination registers are used here to represent the source and destination operands of the instruction. The source registers support solving read-after-write (RAW) data dependencies. If a later instruction has the same source register as the destination register of an earlier instruction, then the later instruction has RAW data dependency. The later instruction must wait for completion of the earlier instruction before it can start execution. The register scoreboard 40 is used to keep track of the completion time of the destination registers of the earlier instructions and hence keep a time entry for each destination register for all pending instructions in the execution pipeline. In the preferred embodiment the completion time is maintained in reference to the time count 90.

Each of the units shown in the block diagram of FIG. 1 can be implemented in integrated circuit form by one of ordinary skill in the art in view of the present disclosure. With regard to one embodiment of this invention, time counter 90 is a basic N-bit wrap-around counter incrementing by 1 every clock cycle. The time-resource matrix 50 is preferably implemented as registers with entries read and written as with a conventional register structure.

The integrated circuitry employed to implement the units shown in the block diagram of FIG. 1 may be expressed in various forms including as a netlist which takes the form of a listing of the electronic components in a circuit and the list of nodes that each component is connected to. Such a netlist may be provided via an article of manufacture as described below.

In other embodiments, the units shown in the block diagrams of the various figures can be implemented as software representations, for example in a hardware description language (such as for example Verilog) that describes the functions performed by the units described herein at a Register Transfer Level (RTL) type description. The software representations can be implemented employing computer-executable instructions, such as those included in program modules and/or code segments, being executed in a computing system on a target real or virtual processor. Generally, program modules and code segments include routines, programs, libraries, objects, classes, components, data structures, etc. that perform particular tasks or implement particular abstract data types. The program modules and/or code segments may be obtained from another computer system, such as via the Internet, by downloading the program modules from the other computer system for execution on one or more different computer systems. The functionality of the program modules and/or code segments may be combined or split between program modules/segments as desired in various embodiments. Computer-executable instructions for program modules and/or code segments may be executed within a local or distributed computing system. The computer-executable instructions, which may include data, instructions, and configuration parameters, may be provided via an article of manufacture including a non-transitory computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The aforementioned implementations of software executed on a general-purpose, or special purpose, computing system may take the form of a computer-implemented method for implementing a microprocessor, and also as a computer program product for implementing a microprocessor, where the computer program product is stored on a non-transitory computer readable storage medium and includes instructions for causing the computer system to execute a method. The aforementioned program modules and/or code segments may be executed on suitable computing system to perform the functions disclosed herein. Such a computing system will typically include one or more processing units, memory, and non-transitory storage to execute computer-executable instructions.

Figure 2:
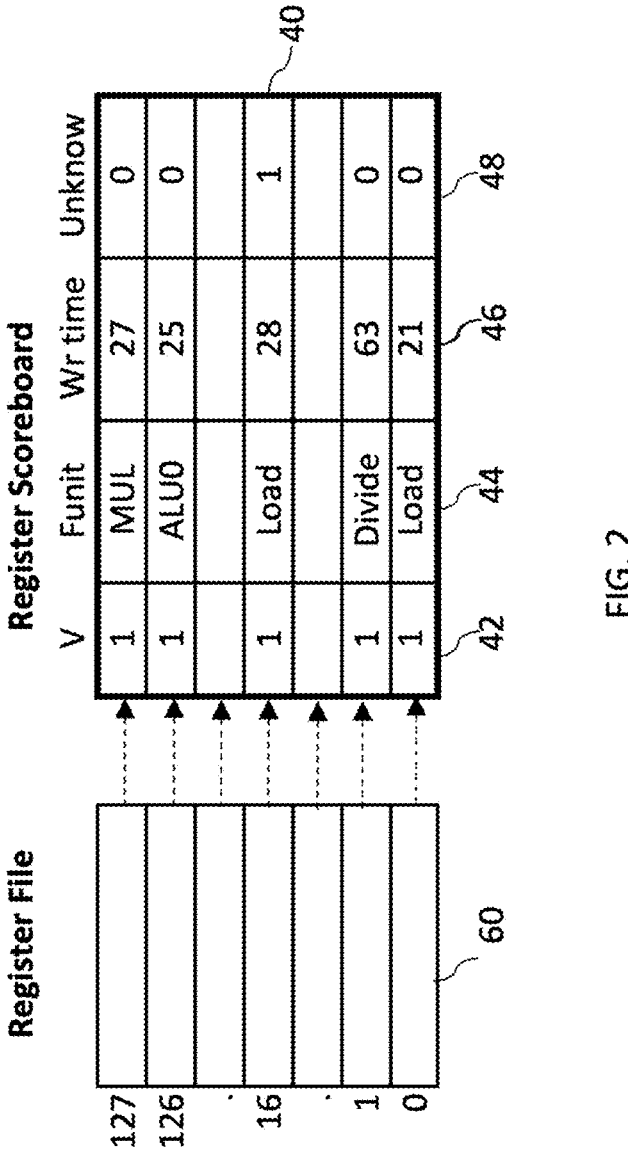
FIG. 2 is a block diagram illustrating a register file and a register scoreboard.

FIG. 2 illustrates the register file 60 and the register scoreboard 40. In one embodiment, the register file 60 has 128 registers, numbered as registers 0 to 127 as illustrated. Each register in the register file 60 has a corresponding entry in the register scoreboard 40. The register scoreboard 40 stores the pending write status for the registers 60. A valid bit field 42 indicates a valid write back to the register file 60 at a future time in reference to the time count 90, as specified by the write time field 46 from a specific functional unit in the "Funit" field 44 unless the unknown field 48 is set. As examples illustrated in FIG. 2, register 0 is written back at time count 21 from the load-store unit 80. Register 1 is written back at time count 63 from the divide unit (one of the functional units 75). Register 126 is written back at time count 25 from the ALU0, (another of the functional units 75), etc. as illustrated in FIG. 2. Register 16 has the unknown bit set indicating that the load data from the load-store unit 80 have an unknown write-back time. The write time 46 is the time in reference to the time count 90 when the result data is written to the register file 60. The data is not available from the register file 60 until the next clock cycle, but the result data can be forwarded from the functional unit 44 in the register scoreboard 40. For example, if the value of the time count 90 is 19, then the load-store unit 80 produces the result data in 2 clock cycles for writing back to the register 0 of the register file 60 at time count 21. When the load instruction is issued, the write time is based on the data cache hit time to set the write time 46 of the register scoreboard 40. The load data may be delayed which will cause the write time 46 of the register scoreboard 40 to be modified based on the delay time. In an example, the write time 46 of the load may be modified based on the latency of L2 cache (not shown, outside of the processor 10). The load data can be further delayed because of a L2 cache miss, and the delay time may be unknown, in which case the unknown field 48 of the register scoreboard 40 is set. A subsequent instruction with RAW data dependency on the destination register of the load instruction is rescheduled (or replayed) as the write time for the destination register changes. The mechanism to replay instructions will be detailed later in the description of the execution queue 70.

The write time of a destination register is the read time for the subsequent instruction with RAW data dependency on the same destination register. Referring back to FIG. 1, the source registers of an instruction in the instruction decode unit 30 access the register scoreboard 40 for the read times. If the valid bit 42 of a source register is not set in the register scoreboard 40, then the data is in the register file 60 and can be accessed at any time providing availability of the read buses 66, else the write time 46 is the earliest time to issue the instruction.

An instruction reads source operand data at read time, executes the instruction with a functional unit 75 at execute time, and writes the result data back to the register file 60 at write time. The write time is recorded in the write time field 46 of the register scoreboard 40. With 2 source registers, the instruction selects the later write time from the register scoreboard 40 as the read time for the instruction. The execute time is the read time plus 1 time count where the functional unit 75 or the load-store unit 80 starts executing the instruction. The write time of the instruction is the read time plus the instruction latency time. If the instruction latency time is 1 (e.g., an ALU instruction), then the write time and execution time of the instruction are the same.

Each instruction has an execution latency time. For example, the add instruction has a latency time of 1, the multiply instruction has a latency time of 2, and the load instruction has a latency time of 4 assuming a data cache hit. In another example, if the current time count is 5 and the source registers of an add instruction receive write time counts of 22 and 24 from the register scoreboard 40, then the read time count is set at 24. In this case, the execution and the write time counts are both 25 for the add instruction. As shown in FIG. 1, the register scoreboard 40 is coupled to the time-resource matrix 50 where the read, execute, and write phases of an instruction access the time-resource matrix 50 for availabilities of the resources.

Figure 3:
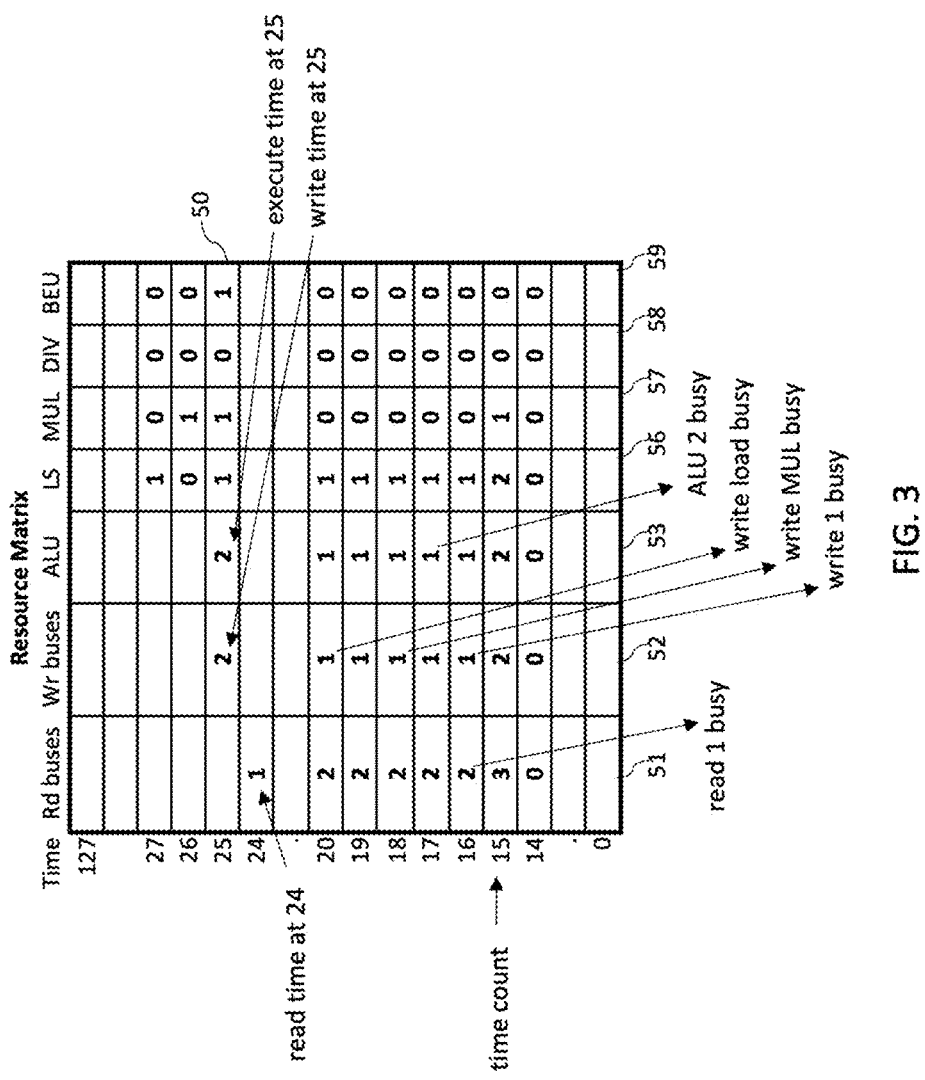
FIG. 3 is a block diagram illustrating a time-resource matrix.

FIG. 3 illustrates the time-resource matrix 50. The time-resource matrix 50 preferably includes the same number of time entries as the time counter 90. For example, if the time counter 90 returns to zero after 128 cycles, then the time-resource matrix 50 preferably has 128 entries. The time counter is incremented every clock cycle and rotates back from the 127th entry to the 0th entry. The columns in the time-resource matrix 50 represent the availability of specific resources. In the embodiment shown in FIG. 3 the time-resource matrix 50 is arranged to identify the availability of resources by identifying the resources that are busy, and specifically the read buses 51, the write buses 52, the ALUs 53, the load-store ports 56, the multiply unit 57, the divide unit 58, and the branch execution unit (BEU) 59. These resources are an example, and if other functional units are provided by microprocessor 10 those are also included in the time-resource matrix 50.

The read buses column 51 corresponds to the plurality of read buses 66 in FIG. 1. The write buses column 52 corresponds to the plurality of write buses 68 in FIG. 1. The ALUs column 53, the multiply column 57, the divide column 58, and the branch execution unit column 59 correspond to the plurality of functional units 75 of FIG. 1. The load-port ports column 56 corresponds to the load-store unit 80 of FIG. 1. The load instructions are issued from the instruction issue unit 55 with the expectation of data being in the data cache 85 (i.e., a data cache hit). In one embodiment, when the data is not present in the data cache 85, then the load instruction changes the write time in the register scoreboard 40 for the latency time of an L2 cache. The instructions that are dependent on the destination register of the replayed load instruction are also replayed. The same procedure is used for replaying instructions where the new replay read time, replay execute time, and replay write time are determined based upon a check of the time-resource matrix 50 for availability of resources. The replayed instructions are statically scheduled for execution with the same procedure as issued instructions where all resources are shared between issuing and replaying.

FIG. 3 also shows an example of the information in the time-resource matrix 50. Shown is data with a read time count of 24, an execution time count of 25, and a write time count of 25. When an instruction accesses the time-resource matrix 50 for availability of resources, the matrix 50 shows that at read time 24, 1 read bus is busy, at execution time 25, 2 ALUs, 1 load-store port, 1 multiply unit, and 1 BEU are taken for execution of previous instructions, and at write time 25, 2 write buses are busy. In one embodiment, the numbers of read buses, write buses, ALUs, load/store ports, multiply unit, divide unit, and BEU are 4, 4, 3, 2, 1, 1, and 1, respectively. If an add instruction with 2 source registers and 1 destination register is issued with read time of 24, execution time of 25, and write time of 25, then the number of read buses 51 at time 24, write buses 52 at time 25, and ALUs 53 at time 25 are incremented to 3, 3, and 3, respectively. The read bus 51 indicates that 1 read bus is busy, so the next 2 read buses 1 and 2 (in-order) are assigned to the source registers of the add instruction. The ALU unit 53 indicates that 2 ALUs are busy, so the next in-order ALU 2 is assigned as functional unit for execution of the add instruction. The write bus 52 indicates that 2 write buses are busy, so the next in-order write bus 2 is assigned to write back data from ALU 2 to the register file 60. The resources are in-order assigned to the instructions as with the replay resources. The source registers of the add instruction will receive data from read buses 1 and 2, ALU 2 is used for execution of the add instruction and write bus 2 is used to write back data from ALU 2. The counts in the row are reset by the time count. As illustrated in FIG. 3, when the time count is incremented from 14 to 15, all resource counts of row 14 are reset. All resource counts of row 15 are reset when the count is incremented to 16 in next cycle. If an issued instruction is a multiply instruction with execution time of 25, since there is only one multiply unit 57, the issued instruction cannot be issued for execution time of 25. In another embodiment, two read times, two execution times, and two write times are used per instruction with expectation that one set of times is free of conflict, increasing the chance for instruction issuing. In another embodiment, the counts indicate the number of available resources. The resource counts are decremented if the resource is assigned to an issued instruction.

FIG. 3 also shows another example of dynamic replaying of an instruction in the time-resource matrix 50. The dynamic replay means replay of an instruction without accessing the time-resource matrix 50. The current time count is at time 15 and the next cycle is at time count 16, the read and write bus availability at time 16 are provided as "read 1 busy" and write 1 busy," respectively. The replayed instruction can use the availability of the read and write buses to replay the instruction without accessing the time-resource matrix 50. If a load instruction is replayed because of data bank conflict that causes a delay of 1 clock cycle then only a write bus is needed to write data back to the register file 60. If the write bus is available in the next cycle by indication of "write 1 busy", then the load data are written back to the register file to cause completion of the load instruction. The availability of the write bus in the cycle after time count 15 is used exclusively by the load instruction because issued instructions cannot write back to register file 60 in the next cycle. For example, replay of an ALU instruction requires a read bus in the next cycle, "read 1 busy", an ALU in 2 cycles later, "ALU 2 busy", and a write bus in 2 cycles later, "write ALU busy". Replay of the ALU instruction bypasses the time-resource matrix 50 where the register scoreboard 40 and the write control unit 64 are set for writing to the register file 60. Note that if the read time of the current issued instruction is at time 16, then the read bus is designated as busy in the time-resource matrix 50 regardless of whether the current instruction is issued at time 16 or not. Similarly, the other instruction types are dynamically replayed with corresponding busy entries in the time-resource matrix 50.

In one embodiment, each resource represented in the time-resource matrix 50 is implemented as an independent register file where the number of entries is the same as the time counter 90, and each entry consists of a resource count. The issued or replayed instruction accesses individual resources as needed, instead of accessing all resources in the time-resource matrix 50.

The availability of all resources for the required times are read by the instruction issue unit 55 from the time-resource matrix 50 and sent to the instruction issue unit 55 for a decision of when to issue an instruction to the execution queue 70. If the resources are available at the required times, then the instruction can be scheduled and sent to the execution queue 70. The issued instruction updates the register scoreboard 40 with the write time and updates the time-resource matrix 50 to reduce the available resource values. All resources must be available at the required time counts for the instruction to be dispatched to the execution queue 70. If all resources are not available, then the required time counts for the instruction in question are incremented by one, and the time-resource matrix 50 is checked as soon as the same cycle or next cycle. The particular number of read buses 66, write buses 68, and functional units 75 in FIG. 1 is preferably chosen to minimize stalling of instructions in the instruction issue unit 55.

Figure 4B:
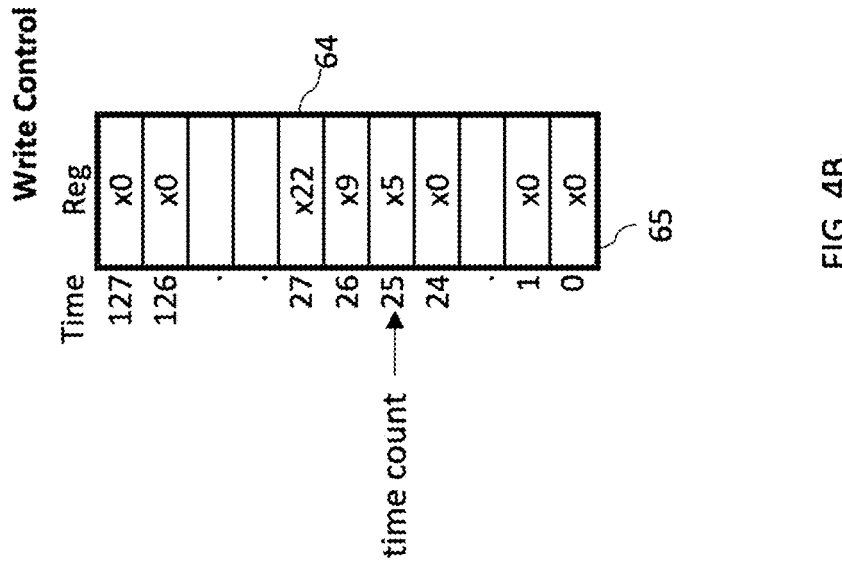
FIGS. 4A and 4B are block diagrams illustrating a read bus control and a write bus control.
Figure 4A:
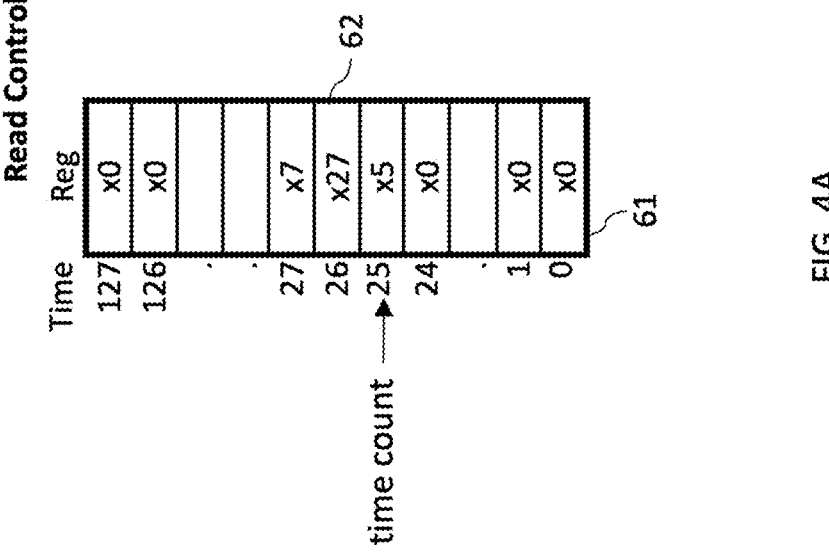

FIG. 4A illustrates a single read bus of the read control unit 62 and FIG. 4B a single write bus of the write control unit 64. The read control unit 62 and the write control unit 64 include a number of time entries to match the time counter 90. As mentioned above, in a preferred embodiment the time count is incremented every clock cycle. The column in the read control unit 62 represents the source register 61. The column in the write control unit 64 represents the destination register in the write bus 65. In one embodiment, microprocessor 10 uses the RISC-V instruction set architecture. In that architecture, register 0 (x0) is not a real register; reading of register x0 returns 0 and writing to register x0 is ignored. The x0 register is used as an invalid read and write to the register file 60. If a different instruction set architecture is used, then the read control unit 62 and the write control unit 64 can include another column of valid bits (not shown) to indicate a valid read or write, respectively. As illustrated in FIGS. 4A and 4B, when the time count is incremented from 25 to 26, the register fields 61 and 65 of row 25 will be reset to x0 to indicate that those resources have been freed up. The register fields 61 and 65 of row 26 are reset to x0 when the count is incremented to 27 in the next cycle. FIGS. 4A and 4B show a single read bus 66 and a single write bus 68, respectively. If, however, 4 read buses and 3 write buses are implemented, then the functionality of FIGS. 4A and 4B are duplicated 4 times and 3 times, respectively.

In the example illustrated in FIG. 4A, at the time count of 25 the register x5 from the register field 61 of the read control 62 is used to read the entry 5 from the register scoreboard 40 for the valid bit 42, the "Funit" 44, and the write time 46. If the valid bit 42 is set and the write time 46 is equal to the time count 90, then the data is forwarded from the "Funit" 44 instead of reading from the register file 60. If the valid bit 42 is reset, then the data is read from the register file 60. If the valid bit 42 is set and the write time 46 is greater than the time count 90, then the instruction is replayed where the write time 46 is the read time for the replay instruction. The replay instruction will access the time-resource matrix 50 to reissue the instruction to the replay execution queue. In the next cycle, when the time count is 26, the register x27 from the register field 61 is used to read from the register file 60. The read control unit 62 is responsible for supplying the source operand data on a specific one of the read buses 66. The execution queue 70 keeps the information of which one of the read buses 66 is to receive source operand data. The execution queues 70 and read control unit 62 are synchronized based on the time-resource matrix 50. The read control unit 62 provides centralized control for the read buses 66, thus reducing complexity from the hundreds of instructions in dynamic scheduling. Similarly in FIG. 4B, the register x5 from the register field 65 of the write control unit 64 at time count of 25 is used to write to the register file 60. The register x5 will also access the "Funit" 44 of the register scoreboard 40 to get the result data from a specific functional unit 75. Again, the execution queues 70, the functional units 75, and the write control unit 64 are synchronized to transfer result data on a write bus 68 to write to the register file 60. The write control unit 64 is the centralized control for the write buses 68 which removes complexity compared to the plurality of functional units in dynamic scheduling.

FIG. 5 illustrates an example of a 4-entry execution queue 70. The number of entries for the execution queue 70 is only an illustration. The invention is not limited to any number of execution queue 70 entries and the execution queue 70 could take the form of a single-entry execution queue. Each entry is an instruction waiting for execution by one of the functional units 75 or the load/store unit 80 according to the time count in the read time column 77. Each entry in the execution queue 70 preferably consists of the following fields: valid bit 71, control data 72, immediate data 73, first source register select 74, second source register select 76, read time 77, destination register number 79, source register numbers 179, replay valid 172, first and second source register valid 174, load data 176 (for load/store execution queue only), write valid 173, unknown time 178, and read time 77. The valid bit 71 indicates that the entry is valid in the execution queue 70. The control data 72 specifies the specific operation to be used by the functional units 75 or the load/store unit 80. The immediate data 73 is an alternative to the second source register for the instruction. The valid indication for the immediate data 73 may be included in the control data field 72. Most instructions have an option to use immediate data 73 instead of data from the second source register. The first source register select 74 identifies which one of the read buses 66 has the operand data for the first source register. The second source register select 76 identifies which one of the read buses 66 has the operand data for the second source register. The source register selects 74 and 76 may not be used for some instructions. The destination register number 79 and the source register numbers 179 are referenced to registers in the register file 60. These register numbers are used only for replaying of an instruction.

Note that the destination register can be, but does not need to be, kept with the instruction. The write control unit 64 is responsible for directing the result data from a functional unit 75 to a write bus 68 to write to the register file 60. The execution queues 70 are only responsible for sending instructions to the functional units 75 or the load-store unit 80. The read time field 77 which has the read time of the instruction is synchronized with the read control unit 62. When the read time 77 is the same as the time count 90 as detected by the comparators 78, the instruction is issued to the functional units 75 or the load/store unit 80. For the example in FIG. 5, the entries are issued to the functional units out-of-order. The read time field 77 indicates that the fourth entry is issued at time count 20, the second entry is issued at time count 25, the third entry is issued at time count 27, and the first entry is issued at time count 32.

FIG. 5 shows four examples of instruction types in the execution queue 70. The fourth entry (shown as the top row) is normal dispatching of an instruction to a functional unit 75 at read time 20, and the first source operand data is from fourth read bus 66 as indicated by the first source register select 74 and the second source operand data is from fifth read bus 66 as indicated by the first source register select 76. In one embodiment, the control data 72 includes identification of a functional unit 75 for dispatching of the instruction. The control data 72 and immediate data 73 are dispatched to the functional unit. The valid bit 71 is reset at time 20 from the read time 77 when the instruction is dispatched to the functional unit 75. The other fields (172, 174, 176, 173, 178) of the fourth entry are not used as the instruction is not replayed.

The load/store instruction takes many cycles through the load-store unit 80 and the data cache 85. In one embodiment, the load/store instruction comprises a load-store pipeline that takes 4 clock cycles, with a clock cycle for each of the following four operations: (1) address calculation and accessing the TLB, (2) accessing the tag array to read the physical address for hit/miss comparison, (3) accessing the data array to read data from a specific data bank, and (4) aligning data and writing to the register file. The load/store entry in the execution queue 70 remains valid until completion. There are 2 mechanisms for replay of a load/store instruction: (1) from the beginning of the load-store unit 80 pipeline at the address calculation and TLB access stage, or (2) for a load instruction to dynamically replay and write load data directly to the register file 60 without going through the load-store unit 80 and the time-resource matrix 50. In this latter instance (mechanism (2)), the execution queue 70 tracks the load/store instruction as it processes through the 4 stages of operations. If the instruction is replayed, the execution queue 70 is responsible to replay the instruction by checking availability of the write buses 68. The possible replay cases are: (1) the source register is not available by modification of the write time in the register scoreboard 40 in which case the instruction is not sent to the load-store unit 80, (2) the L1 TLB miss in the first cycle in which the L2 TLB is accessed to update the L1 TLB wherein the replay is from the beginning, (3) delay due to data bank conflict or ECC 1-bit error correction, and (4) data cache miss. In all these cases, the replayed time should be known or can be estimated to update the register scoreboard 40 for subsequent dependent instructions. The L2 TLB accessing time and the L2 cache accessing time are used as the estimated times to replay the load/store instructions. These times, in clock cycles, are known and therefore predetermined for a particular implementation. The ECC 1-bit error correction is an extra cycle, where the load data is from the error correction register to write to the register file 60. The data bank conflict is preferably known the exact delayed cycle for replay which will be discussed in further detail. Replaying of a load instruction has a preset time but if the write bus is not available, then the write time in the register scoreboard 40 is modified (time count+2) and the load data is written into the load data field 176 of the execution queue 70. The execution queue 70 continuously checks write buses every 2 cycles to write data back to the register file 60.

In an embodiment, the steps to execute an instruction from the instruction decode unit 30 of the microprocessor 10 are: (1) decoding the instructions in instruction decode unit 30 for operand registers, instruction type, latency and throughput times, (2) accessing the register scoreboard 40 for RAW data dependency in which the worst case write time 46 of the register scoreboard 40 is the read time of the instruction and the execution and write times are calculated, (3) accessing the time-resource matrix 50 for availability of the read port(s), the functional unit, and write port based on the read, execution, and write times to set the read port control 62, write port control 64, and to dispatch instruction to an execution queue 70, (4) the execution queue 70 dispatches an instruction to a functional unit 75, and the read port control 62 accesses the register file 60 to read source operand data and the register scoreboard 40 to confirm data from the register file 60 or to forward data from a functional unit 75 or to replay the instruction where all information is processed by the dispatch logic 170 to determine if the instruction is replayed, (5) if the instruction is not replayed, then it is executed in one functional unit 75 or load-store unit 80 and produces result data at the expected write time, and (6) the write port control 64 accesses the register scoreboard 40 to ensure that the write time 46 has not been delayed, resets the valid bit 42 of the destination register, and uses the functional unit 44 to write the result data from the functional unit 75 or the load-store unit 80 to the register file 60. If the result data is not written by the load-store unit 80 at the expected write time to the register file 60, then the load data can be delayed by data cache miss or data bank conflict. In this example, the instruction can be replayed in step (4) as determined by the dispatch logic 170 of the execution queue 70 or step (6) and the entry in the execution queue 70 remains valid and sets replay bit 171 along with many other bits in the execution queue 70 as shown in FIG. 5.

The first entry of FIG. 5 (shown as the bottom row) illustrates replaying of an instruction in accordance with the above step (4) where the write time 46 in the register scoreboard 40 is greater than the time count 90 for the first source register. The read port control 62 accesses the source register information from the register scoreboard 40 and sends to the dispatch logic 170 for a determination if the instruction is to be replayed. In this example, the second source operand data are valid but the first source operand data are not valid. The second source register valid bit 174 is set and the second source operand data are written into immediate data field 73. The replay instruction needs to fetch only the first source operand data for execution. The write time 46 in the register scoreboard 40 for the first source register is used as the new read time to replay the instruction. The write times 46 of the register scoreboard 40 for both source registers can be greater than the time count 90 and the read time for replaying the instruction is based on the longest write time 46. The dispatch logic 170 also calculates the execution and write times based on the latency time of the instruction from the read time and are such times are used to access the replay read buses 151, the replay write bus 152, and a functional unit replay resource 153 or 159 or a shared functional unit resource 56, or 57, or 58 of the time-resource matrix 50. If the resources are available, then the new read time is written into the read time 77. Note that the read time entry of the read port control 62 is written with the source register(s) and the write time entry of the write port control 64 is written with the destination register which is from the write register 79 of the execution queue 70. If at least one resource is not available, then the unknown bit 48 in the register scoreboard 40 is set for the destination register 79 and the unknown bit 178 in the execution queue 70 is set to cause the instruction to be replayed by the retire order of the instruction. In another embodiment, two read times, two execution times, and two write times are used per replay instruction with the expectation that one set of times is free of conflict, increasing the chance for instruction issuing. In another embodiment, the re-order buffer (not shown) in processor 10 is used to track the order of instructions as they are issued from the instruction decode unit 30 to retire the instructions in-order after the instructions are out-of-order executed. The re-order buffer is coupled with the execution queues 70 to indicate that the unknown entry is the next instruction to be retired in-order. Note that the control data field 72 of the execution queue 70 includes the re-order buffer entry to synch with the re-order buffer retire entry. At the retire order, the unknown entry of the execution queue 70 repeatedly accesses the time-resource matrix 50 for available resources until the unknown entry can be dispatched to functional unit 75 in the next cycle. The execution queues 70 must keep the source and destination register numbers in the write register field 79 and source registers field 179 in order to access the register file 60 and the register scoreboard 40.

In one embodiment, an execution queue 70 dispatches instructions to multiple functional units 75 at the same time. For example, the execution queue 70 is coupled to multiple ALU functional units 75. The time-resource matrix 50 assigns the ALU functional units in-order to the issue instructions. Similarly, the time-resource matrix 50 assigns the replay ALU functional units in-order to the replay instructions. The time-resource matrix 50 keeps the issue and replay ALU functional units separate to avoid conflict between the issue and replay instructions. The issue and replay ALU functional units may be numbered continuously such as 0-3 for 4 issue ALUs and 4-5 for 2 replay ALUs. The execution queue 70 does not distinguish the ALU type and can dispatches 6 instructions to 6 ALU functional units.

The second entry of FIG. 5 illustrates replaying of a load instruction in accordance with the above step (6) where the load data delay is detected and does not write load data back to the register file 60 at the expected write time. As an example, the data cache miss is not known at the time the load instruction is dispatched from the execution queue 70 to the load-store unit 80. The second entry remains valid until the cycle where the data cache hit or miss is determined at which time the valid bit 71 of the second entry can be reset or remain set for replaying. In this determination of whether to reset the second entry or to remain it set for replaying the execution queue tracks the load/store instruction as it processes through the 4 stages of operations. If the instruction is replayed at whichever stage, the execution queue 70 changes to replay. If the load instruction goes through all 4 stages, then the entry is invalidated by resetting the valid bit 71. It is important for the entry in the execution queue 70 to remain valid until the load is completed as the execution queue full signal stalls the next load or store instructions in the instruction issue Unit 55 of the processor 10. Maintaining the valid bit 71 set permits subsequent load or store instructions to proceed. The L2 cache latency time updates the write time 46 in the register scoreboard 40 for the destination register and the read time 77 of the second entry of the execution unit 70. Both first and second source register valid bits 174 are set to indicate that this load instruction (second entry of the execution queue 70) is waiting for the load data. When the read time 77 of the second entry matches the time count 90, the load data from L2 cache should be valid and is written back to the register file 60, and the valid bit 42 of the register scoreboard 40 and the valid bit 71 of the second entry of the execution queue 70 are reset. The L2 cache can be a cache miss and not return data at the expected time, in which case the unknown bit 178 of the execution queue 70 and the unknown bit 48 of the register scoreboard 40 for the destination register are set. This case is illustrated in the third entry of FIG. 5.

The third entry of FIG. 5 illustrates replay of a load instruction with unknown time. The external memory (not shown) outside of the processor 10 returns load data at some later time, writes into the immediate data field 73, and the write valid bit 173 of the third entry of the execution queue 70 is set. At the retire order, if the write valid bit 173 is not valid, then the third entry must wait until the write valid bit 173 is set. If the write valid bit 173 is set, then the unknown entry repeatedly accesses the time-resource matrix 50 for available write buses 52 and replay write buses 152 until the immediate data 73 can be written to the register file 60 with the destination register in the write register 79 in the next cycle. Since no issue or replay instruction uses the write bus resources of the time-resource matrix 50 in the next clock cycle, in this example the third entry of the execution queue 70 can use any available write bus resource in the next cycle without any conflict. Along with writing data back to the register file 60, the valid bit 42 in the register scoreboard 40 and the valid bit 71 of the third entry of the execution queue 70 are reset.

Figure 6:
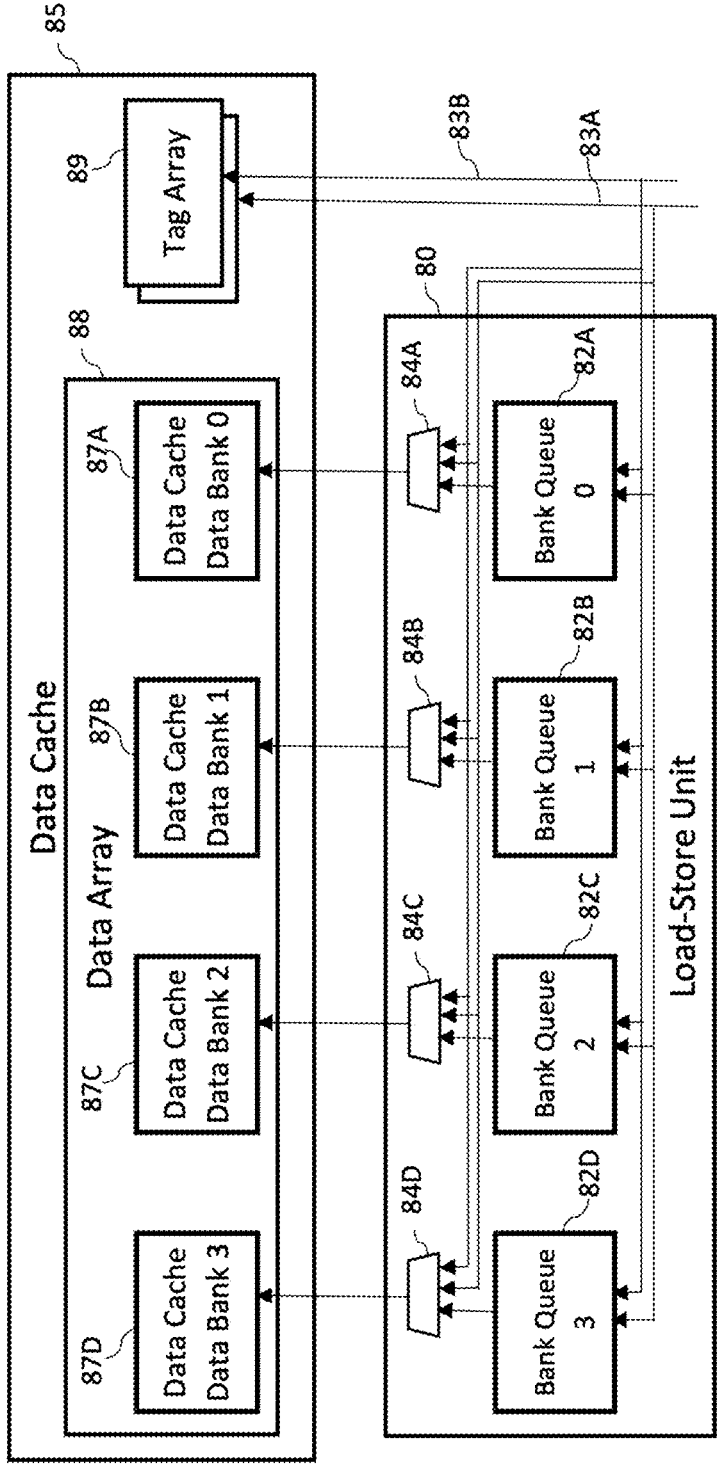
FIG. 6 is a block diagram illustrating a load-store unit with multiple bank queues to access multiple data banks of a data cache.

FIG. 6 shows one embodiment of a data bank queue that provides the exact delay time for load instructions. A data bank conflict can happen due to multiple load instructions accessing the same data bank. An unaligned load instruction can access multiple data banks which increases the chance of data bank conflict. The load-store unit 80 consists of 4 data bank queues, 82A, 82B, 82C, and 82D, each of which corresponds to a data bank, 87A, 87B, 87C, and 87D of the data array 88 of the data cache 85. In an example, there are 4 data banks and bank queues, the labels for the data banks and bank queues are 0, 1, 2, and 3. The 4 data banks are numbers, 87A, 87B, 87C, and 87D, respectively. The 4 bank queues are numbers, 82A, 82B, 82C, and 82D, respectively. The data bank queues are collectively referred to as data bank queue 82 and the various data banks are collectively referred to as data bank 87. In general, the addresses 83A and 83B access the tag arrays 89 to determine a cache hit/miss. If is the tag arrays 89 provide a result of a cache hit, then the load instruction accesses the data bank(s) of data array 88 to read data and write to the register file 60. The addresses 83A and 83B can have bank conflict in which case one address is written into data bank queue 82 and one address accesses the data cache bank 87. The multiplexors 84A, 84B, 84C, and 84D are used to select the address 83A or 83B or the address supplied by the data bank queues 82A, 82B, 82C, and 82D, respectively. The multiplexors are collectively referred as multiplex 84. In one embodiment, the address in the data bank queue 82 has higher priority than the addresses 83A or 83B to be selected for the multiplex 84. If there is a valid entry in the data bank queue 82 then the addresses 83A or 83B must be written to the data bank queue 82. In one implementation, the number of entries in the data bank queue 82 is 4. The position in the data bank queue 82 is the delay cycles for the load instruction to write back to the register file 60. For example, if the data bank queue 82 has 1 valid entry, then the delay cycles for the valid address 83A or 83B to the same data bank is 1 which is the new write time to the register scoreboard 40. The valid entry in the data bank queue 82 has priority to be selected by the multiplex 84 to the data cache bank 87 while the new address to the same data bank is written to the data bank queue 82 and accesses the data cache bank 87 in the next cycle. In case the data bank queue 82 is full with 4 valid entries, then one entry is selected to access the data bank queue 87, unless both addresses 83A and 83B are to the same data bank 87, then the data bank queue 82 is not full. If both addresses 83A and 83B are to the same data bank when the data bank queue 82 is full, then one of the addresses will be replayed from the beginning from the execution queue 70. In the above implementation of the data bank queue 82, the exact delay cycles are known to replay the load instruction. The number of bank queues and data banks in FIG. 6 are for illustration purpose, the number of bank queues and data banks can be much higher. A larger number of bank queues and data banks reduces the chance of data conflict.

In an embodiment, each functional unit 75 has its own execution queue 70. In another embodiment, an execution queue 70 dispatches instructions to multiple functional units 75. In this case, another field (not shown) can be added to the execution queue 70 to indicate the functional unit number for dispatching of instructions.

Referring back to FIG. 1, the execution queues 70 are coupled to the load store unit (LSU) 80 and the functional units 75. The execution queues 70 issue the instructions to the functional units 75 or the load/store unit 80 when the read times 77 are the same as the time count 90. If the instruction is a load/store, then it is dispatched to the LSU 80, else it is dispatched to one of the functional units 75. The LSU 80 and functional units 75 are also coupled to the read buses 66 and write buses 68 to access the register file 60. The source operand data are fetched from register file 60 and transported on read buses 66 to the LSU 80 and functional units 75. The result data from the LSU 80 and functional units 75 are transported on write buses 68 to write to destination registers in the register file 60. The LSU 80 is also coupled to the data cache 85. The LSU 80 executes the load and store instructions to read and write data from the data cache 85. If the data are not in the data cache 85, then the cache miss causes that cache line to be fetched from external memory (not shown). Typically, the functional units 75 perform different operations, e.g., ALU, multiply, divide, branch, etc. In other embodiments, the functional units 75 perform the same function, for example, multiple ALUs. Furthermore, the invention is not limited to integer functional units. In other embodiments the functional units include floating point units, digital-signal processing units, vector processing units, or custom designed units.

The foregoing explanation described features of several embodiments so that those skilled in the art may better understand the scope of the invention. Those skilled in the art will appreciate that they may readily use the present disclosure as a basis for designing or modifying other processes and structures for carrying out the same purposes and/or achieving the same advantages of the embodiments herein. Such equivalent constructions do not depart from the spirit and scope of the present disclosure. Numerous changes, substitutions and alterations may be made without departing from the spirit and scope of the present invention.

Although illustrative embodiments of the invention have been described in detail with reference to the accompanying drawings, it is to be understood that the invention is not limited to those precise embodiments, and that various changes and modifications can be affected therein by one skilled in the art without departing from the scope of the invention as defined by the appended claims.

What is claimed is:

1. A processor comprising:

a time counter storing a time count representing a current time of the processor, wherein the time count is incremented periodically;

an instruction issue unit coupled to the time counter that receives a first load/store instruction, and issues the first load/store instruction with a first preset execution time based on the time count;

an execution queue, coupled to the time counter and the instruction issue unit, that receives the first load/store instruction from the instruction issue unit, and dispatches the first load/store instruction to a functional unit when the first preset execution time corresponds to the time count;

dispatch logic that determines if the load/store instruction will be replayed with known or estimated delay cycles for replay;

a register scoreboard storing a write time of a selected register from a plurality of registers in a register file, wherein the write time is a future time based on the time count;

an instruction decode unit coupled to the register scoreboard, wherein the instruction decode unit reads a write time for each source operand of a second instruction from the register scoreboard, and uses the one or more write times to determine an execution time for the second instruction; and a time-resource matrix unit comprising a plurality of the time-resource registers for storing information relating to available resources for each time count of the N-bit time counter, the time-resource registers storing information for resources that include at least one of: a plurality of read buses, a plurality of write buses, and a plurality of each type of functional units, the time-resource matrix unit checking availability of resources comprising read buses, the write buses, and the functional units, for replaying a first instruction at a second preset execution time, and designating resources necessary to replay the first instruction at the second preset execution time as busy.

2. The processor of claim 1 further comprising:

a clock circuit that causes the time counter to increment the time count with each clock cycle of the clock circuit; and wherein the time counter comprises an N-bit counter which counts from a zero count to an Nth-bit count value, which represents a largest future time for the instruction issue unit to issue a first instruction; and wherein the N-bit counter returns to a zero count after reaching the Nth-bit value.

3. The processor of claim 1 further comprising:

a read control unit having registers storing time count entries specifying when operands may be read and transported on a read bus, and wherein the read control unit further accesses a register scoreboard to determine availability of a first register in a register file, wherein if a write time of the first register is the same as the time count then data is forwarded from the first register instead of being read from the register file.

4. The processor of claim 3 further comprising:

a write control unit having a plurality of write bus control registers, each write bus control register storing a time count entry specifying when result data may be transported on a write bus and written to a second register of the register file;

wherein the write control unit further accesses the register scoreboard to clear a valid bit if the write time stored in the write bus control register is the same as the time count.

5. The processor of claim 4 wherein the execution queue stores a plurality of instructions, and each instruction includes a first read time which is represented by a future time count wherein the execution queue dispatches instructions to at least one functional unit and wherein the read control unit is synchronized with the first read time in the execution queue.

6. The processor of claim 5 wherein the execution queue includes a replay bit corresponding to each instruction in the execution queue, the execution queue operating to:

respond to setting of the replay bit for a particular instruction by updating a read time for the particular instruction with a new read time corresponding to a future time count;

dispatch the particular instruction to at least one functional unit to cause replay of the particular instruction by causing access of the time-resource matrix to determine availability of resources; and set an unknown bit corresponding to the particular instruction if at least one resource to execute the particular instruction is not available at the new read time.

7. The processor of claim 6 wherein the execution queue stores one or more load/store instructions and dispatches each load/store instruction to a load-store unit, wherein each load/store instruction requires multiple clock cycles to complete in the load-store unit and a load/store instruction remains designated as valid in the execution queue until the load/store instruction completes or replays in the load-store unit, wherein a time to replay the load/store instruction is known or estimated.

8. The processor of claim 7 wherein, the dispatch logic:

determines that load data for a load instruction will be delayed and sets a replay bit for the load instruction in the execution queue;

updates a read time corresponding to the load instruction based on an estimated latency time and the time count; and sets an unknown bit corresponding to the load instruction if data to be loaded by the load instruction is not received within the estimated latency time.

9. The processor of claim 8 wherein the dispatch logic sets an unknown bit corresponding to a first instruction of the execution queue to cause the first instruction to be replayed in accordance with a retire order of the first instruction.

10. The processor of claim 9 wherein the instruction repeatedly accesses the time-resource matrix for available resources until resources are available to permit dispatch of the instruction to a functional unit in a next cycle.

11. The processor of claim 7 further comprising a load/store unit that comprises a data bank queue for a data bank of the data cache wherein a valid entry in the data bank queue has higher priority to access the data bank of the data cache than a first load/store instruction to the same data bank wherein a number of valid entries of the data bank queue is used to determine a new write time for replay of the first load/store instruction.

12. The processor of claim 10 wherein the data bank queue comprises a multiplex to select a valid entry in the data bank queue or an address corresponding to the first load/store instruction.

13. A processor comprising:

a clock circuit;

a time counter storing a time count representing a specific time of operation of the processor, wherein the time count is incremented by the clock circuit;

a time-resource matrix coupled to a register scoreboard and the time counter for storing information relating to available resources for each time count of the time counter and wherein the time-resource matrix comprises busy signals of the resources based on the time count;

an instruction issue unit coupled to the time counter for receiving a first load/store instruction, and issuing or stalling the first load/store instruction at a preset execution time as represented by the time count, based on availability of the available resources as provided by the time-resource matrix;

an execution queue coupled to the time counter and the instruction issue unit to receive the first load/store instruction from the instruction issue unit, and dispatch the first load/store instruction to a functional unit when the preset execution time matches the time count;

dispatch logic to track the first load/store instruction through a load-store unit pipeline and replay the first load/store instruction if the first load/store instruction cannot be completed by an expected cycle wherein the execution queue replays the load instruction by determining availability of write buses using the busy signals;

the register scoreboard storing a write time of a register in a register file, wherein the write time is a future time specified by the time count;

an instruction decode unit coupled to the register scoreboard, the instruction decode unit reading a write time for each source operand of a selected instruction from the register scoreboard, and using the write times corresponding to the selected instruction to determine an execution time for the selected instruction; and wherein the available resources include at least one of a plurality of read buses, a plurality of write buses, and a plurality of functional units.

14. The processor of claim 13 further comprising a load/store unit that comprises a data bank queue for a data bank of a data cache wherein a valid entry in the data bank queue has higher priority to access the data bank of the data cache than a first load/store instruction to the same data bank wherein a number of valid entries of the data bank queue is used to determine a new write time for replay of the first load/store instruction.

15. A computer program product for issuing an instruction, the computer program product stored on a non-transitory computer readable storage medium and including instructions for causing a computer system to execute a method that is executable by a processor, the method comprising:

issuing a load/store instruction to an execution queue or stalling execution of the load/store instruction in an instruction issue unit;

executing the load/store instruction at a future time depending on availability of resources specified in a time-resource matrix, wherein the future time is a time defined by a time count from a periodically incremented time counter;

replaying the load/store instruction if the load/store instruction cannot be completed at the future time;

operating the time counter to provide a maximum time count corresponding to a latest future time to issue an instruction;

storing a write time of a register of a register file wherein the write time is a future time defined by the time count; and storing information corresponding to available resources for each time count in the time-resource matrix, wherein the resources comprise at least one of a plurality of read buses, a plurality of write buses, and a plurality of functional units;

wherein the time-resource matrix further comprise a busy signal for each resource based on the time count.

16. The computer program product of claim 15 wherein the method further comprises:

storing in a register of a read control unit a read time that specifies when data may be read from a first register of a register file and transported on a read bus; and storing in a register of a write control unit a write time that specifies when result data may be transported on a write bus and written to a second register of the register file.

17. The computer program product of claim 16 wherein the method further comprises:

storing a plurality of instructions in an execution queue, wherein each instruction includes a read time defined by the time count; and synchronizing the read time of each instruction in the execution queue with the read control unit.

18. The computer program product of claim 17, wherein the method further comprises:

operating the execution queue to dispatch load/store instructions to a load-store unit;

tracking each load/store instruction through the load-store unit; and replaying any load/store instruction if such load/store instruction is not completed in the load-store unit at an expected time wherein a time to replay such load/store instruction is known or estimated for different types of delays.

19. The computer program product of claim 18, wherein the method further comprises:

providing for the load-store unit a data bank queue corresponding to a data bank of a data cache wherein a valid entry in the data bank queue has higher priority to access the data bank of the data cache than a first load/store instruction to the same data bank wherein a number of valid entries of the data bank queue is used to determine a new write time for replay of the first load/store instruction.

20. The computer program product of claim 19 wherein the method further comprises:

replaying a load instruction to write load data back to the register file by determining if a write bus is available based on the busy signal of the time-resource matrix corresponding to the load instruction.

* * * * *